United States Patent [19]
Brouwer et al.

[11] Patent Number: 5,810,154
[45] Date of Patent: Sep. 22, 1998

[54] LOW ACTUATION FORCE ARTICLE SENSOR FOR CONVEYOR

[75] Inventors: Gerald A. Brouwer, Grandville; Charles R. DeVries, Grand Rapids, both of Mich.

[73] Assignee: Mannesmann Dematic Rapistan Corp., Grand Rapids, Mich.

[21] Appl. No.: 664,308

[22] Filed: Jun. 11, 1996

[51] Int. Cl.⁶ .................................................. B65G 43/00
[52] U.S. Cl. .................. 198/718; 198/502.3; 198/810.01
[58] Field of Search ...................................... 198/718, 721, 198/725, 809, 502.3, 572, 751, 781.05, 781.06, 794, 810.01, 437, 444, 460.1–460.3, 464.4

[56] References Cited

U.S. PATENT DOCUMENTS

| | | |
|---|---|---|
| 1,934,707 | 1/1933 | Bowman . |
| 2,785,785 | 3/1957 | Macaluso ................. 198/437 |
| 3,000,489 | 9/1961 | Poel et al. . |
| 3,115,238 | 12/1963 | Holm et al. . |
| 3,116,823 | 1/1964 | Schneider ................. 198/809 |
| 3,206,008 | 9/1965 | Bowman ................. 198/718 |
| 3,269,522 | 8/1966 | Fogg et al. . |
| 3,321,057 | 5/1967 | DeGood . |
| 3,420,355 | 1/1969 | DeGood et al. . |
| 3,621,982 | 11/1971 | Fleischauer et al. . |
| 3,724,642 | 4/1973 | DeGood . |
| 3,730,330 | 5/1973 | DeGood . |
| 3,768,630 | 10/1973 | Inwood et al. . |
| 3,770,102 | 11/1973 | DeGood . |
| 3,826,349 | 7/1974 | Stevenson, III . |
| 3,840,110 | 10/1974 | Molt et al. ........................ 198/781.06 |
| 4,103,769 | 8/1978 | Jorgensen . |
| 4,109,783 | 8/1978 | Vogt . |
| 4,174,777 | 11/1979 | Riehle . |
| 4,202,440 | 5/1980 | Niki . |
| 4,212,385 | 7/1980 | Leach . |
| 4,215,775 | 8/1980 | Gebhardt et al. . |
| 4,223,780 | 9/1980 | Saur . |
| 4,278,166 | 7/1981 | Pirro, Jr. . |
| 4,291,796 | 9/1981 | Gebhardt . |
| 4,301,914 | 11/1981 | Krammer . |
| 4,318,468 | 3/1982 | Bodewes et al. . |
| 4,353,458 | 10/1982 | Saur . |
| 4,361,225 | 11/1982 | Saur . |
| 4,362,238 | 12/1982 | Rivette . |
| 4,441,607 | 4/1984 | Bowman et al. . |
| 4,453,627 | 6/1984 | Wilkins . |
| 4,473,148 | 9/1984 | Saur . |
| 4,488,638 | 12/1984 | Morgan et al. . |
| 4,542,815 | 9/1985 | Leemkuil . |
| 4,572,353 | 2/1986 | Felder . |
| 4,588,073 | 5/1986 | Abell . |
| 4,605,120 | 8/1986 | Vanderlinde et al. . |
| 4,658,951 | 4/1987 | Saunders . |
| 4,817,784 | 4/1989 | Judge . |
| 4,854,445 | 8/1989 | Eaton et al. . |
| 5,016,748 | 5/1991 | Garzelloni . |
| 5,042,644 | 8/1991 | Davis . |
| 5,358,097 | 10/1994 | Bakkila et al. . |
| 5,429,225 | 7/1995 | Schiesser et al. . |

FOREIGN PATENT DOCUMENTS

| | | |
|---|---|---|
| 57-0067404 | 4/1982 | Japan . |
| 62-0100303 | 5/1987 | Japan . |

OTHER PUBLICATIONS

International Search Report from corresponding PCT Application No. PCT/DE97/01204.

*Primary Examiner*—Joseph E. Valenza
*Attorney, Agent, or Firm*—Van Dyke, Gardner, Linn & Burkhart, LLP

[57] ABSTRACT

An article sensor for use with a conveyor having an article conveying surface includes a sensing member, a pivot which pivotally mounts the sensing member to pivot about a horizontal axis, and a bias which biases the sensing member above the conveying surface. The pivot is defined by a shaftless bearing which operates with an exceptionally small amount of friction which is substantially unaffected by side-loading placed on the bearing.

39 Claims, 6 Drawing Sheets

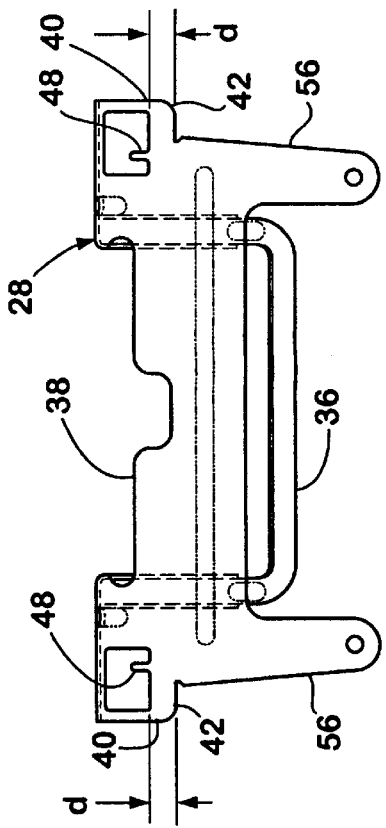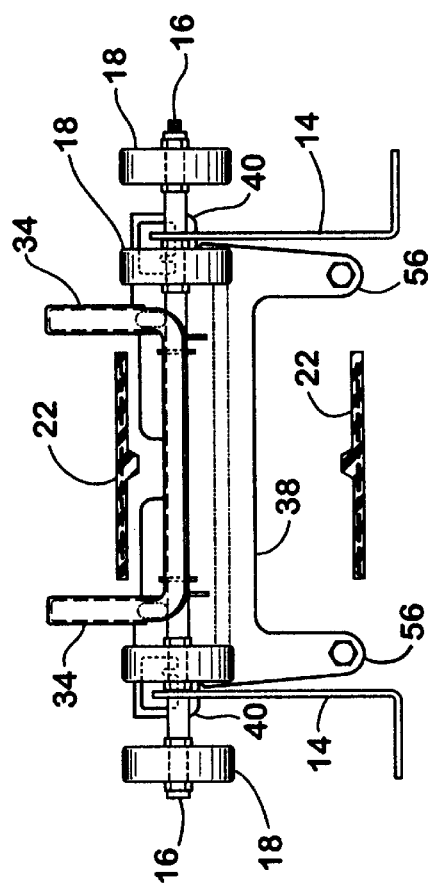

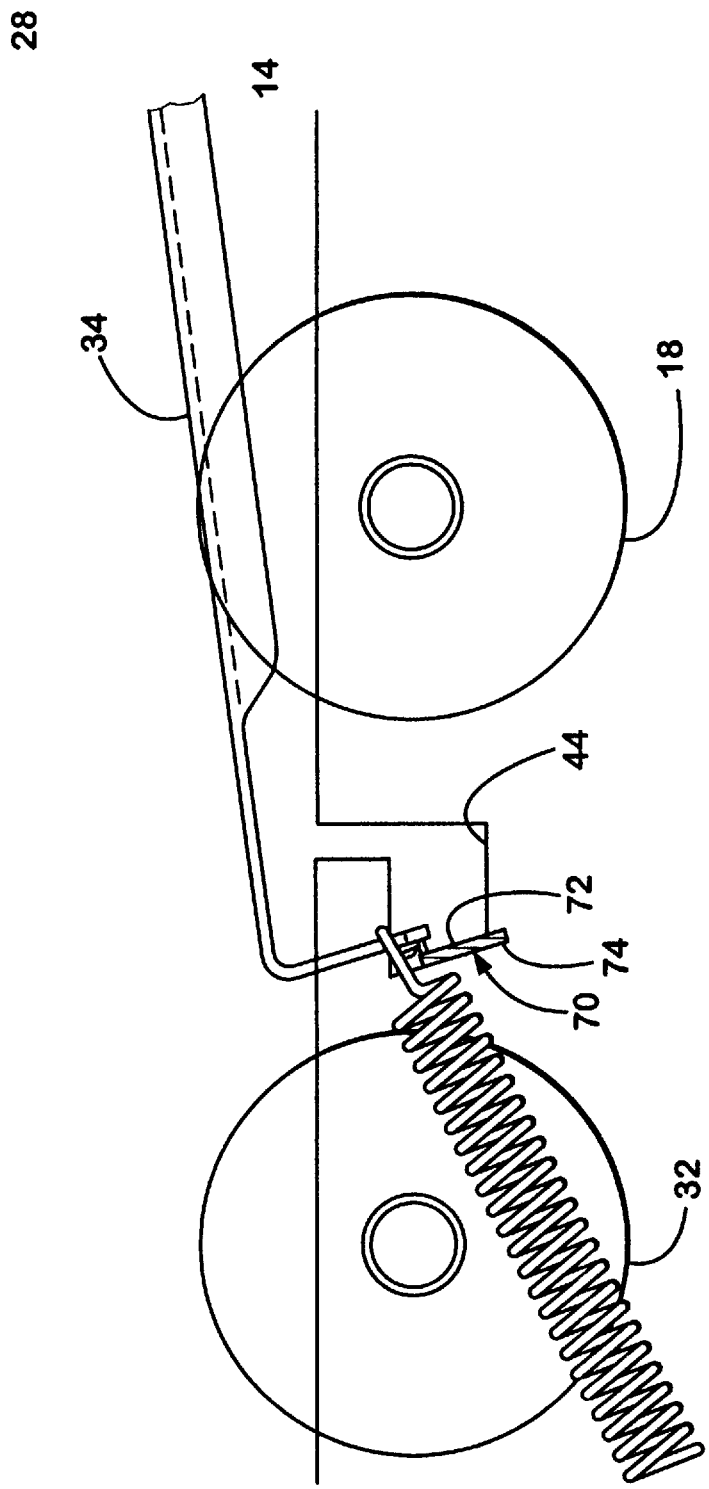

LOW ACTUATION FORCE ARTICLE SENSOR FOR CONVEYOR

BACKGROUND OF THE INVENTION

This invention relates generally to conveyor systems and, more particularly, to sensors which sense the presence of articles at a particular location on a conveyor. The invention is especially adapted for use with mechanically actuated accumulation conveyors, but may be used with pneumatically and electrically actuated accumulation conveyors and other conveying systems.

A long-felt need which has existed in the art of accumulation conveyors is the ability to provide a sensor which can be actuated with a very low actuation force. Sensors are placed along portions of an accumulation conveyor in order to sense the presence of articles at the location of each sensor and to disable one or more upstream zones when a product comes to rest on a sensor. Such sensor typically includes a sensing member which pivots about a shaft and has a portion extending upwardly above the conveying surface. The shaft may be a shaft which also rotatably mounts one of the rollers of the conveying surface or may be a separate shaft dedicated to the sensor. The sensing portion is biased above the conveying surface by either a counterweight or a spring. Such sensors are effective for sensing typical articles, such as containers loaded with articles and the like, but have proven to be unreliable for sensing exceptionally light articles. One such exceptionally light article is a fiber mail tray utilized by a postal service which may be conveyed on the conveying system with little or no contents therein. Such trays have a tare weight of less than a pound, which, when empty, provide an actuation force of less than one-half of one pound.

Prior attempts at providing low actuation force sensors have included providing counterweights having a mass which is only slightly greater than the mass of the sensing portion of the sensing member. However, the actuation force of such sensor may greatly exceed the net difference in weight between the sensing member and the counterweight because friction in the bearings pivotally mounting the sensing member is significantly increased by a side load created by the downward thrust of the combined weight of the sensing member and the counterweight. This side-load induced friction in the bearings may add significantly to the force required to actuate the sensor. Thus, the need for a truly low actuation weight sensor has, heretofore been unmet.

SUMMARY OF THE INVENTION

The present invention provides a low actuation force article sensor which is capable of reliably and consistently sensing lightweight articles, including empty sorting trays utilized by postal services. Advantageously, this is accomplished by a member which is easy to manufacture and assemble and exceptionally rugged in operation.

An article sensor for use with a conveyor having an article conveying surface includes a sensing member, a pivot which pivotally mounts the sensing member to pivot about a horizontal axis, and a bias which biases the sensing member above the conveying surface. The pivot is defined by a shaftless bearing. The shaftless bearing operates with an exceptionally small amount of friction which is substantially unaffected by side-loading placed on the bearing as a result of the weight of the sensing member and any force placed on the bearing by the bias member. In one embodiment, the shaftless bearing is a knife-edge bearing including a bearing member defining an edge which pivots on a surface. In another embodiment, the shaftless bearing is made of a flexible member which is fixed at one end to a surface.

According to another aspect of the invention, the bias member is a spring which is applied to the sensing member through a short lever arm. The short lever arm allows the spring to operate in a small percentage-of-extension region. This provides a more consistent biasing force because a spring bias force increases with length of extension. Therefore, by keeping the extension in a relatively small range, bias force is kept more consistent. Although the short lever arm requires a significant increase in spring tension, the resulting side load on the sensor bearing does not result in a proportional increase in actuation force because the shaftless bearing is relatively immune to increase in friction as a result of an increase in side-loading.

According to yet an additional aspect of the invention, the sensing member, including the bearing, is formed almost entirely from a single piece of sheet metal which is stamped and then formed into a rigid member. The sensing member may be assembled within a pocket formed in a stationary portion of the conveyor frame and held in position by the force of the biasing member.

These and other objects, advantages and features of this invention will become apparent upon review of the following specification in conjunction with the drawings.

BRIEF DESCRIPTION OF THE DRAWINGS

FIG. 4 is a sectional view taken along the lines IV—IV in FIG. 1;

FIG. 5 is a side elevation of a sensing member according to the invention;

FIG. 6 is an end elevation of the sensing member in FIG. 5;

FIG. 8 is the same view as FIG. 3 of an alternative embodiment of the invention.

DESCRIPTION OF THE PREFERRED EMBODIMENT

Figure 1:
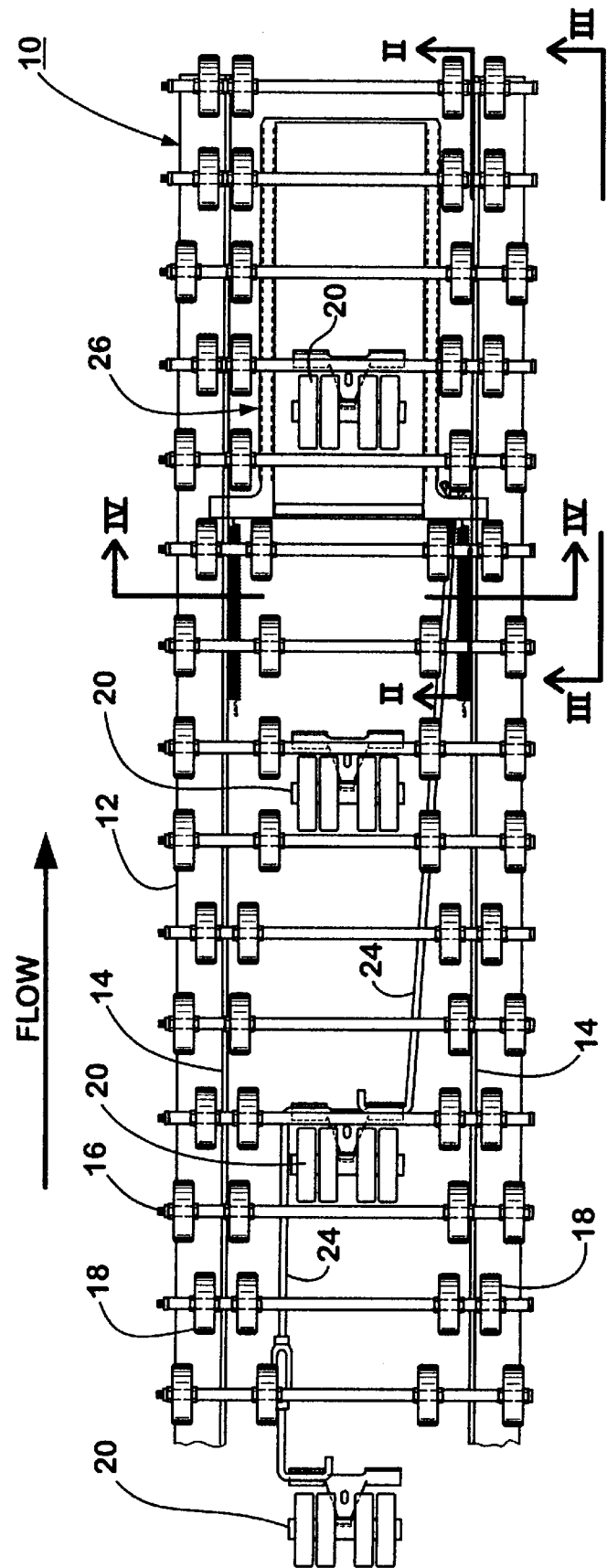
FIG. 1 is a top plan view of an accumulation conveyor according to the invention.
Figure 2:
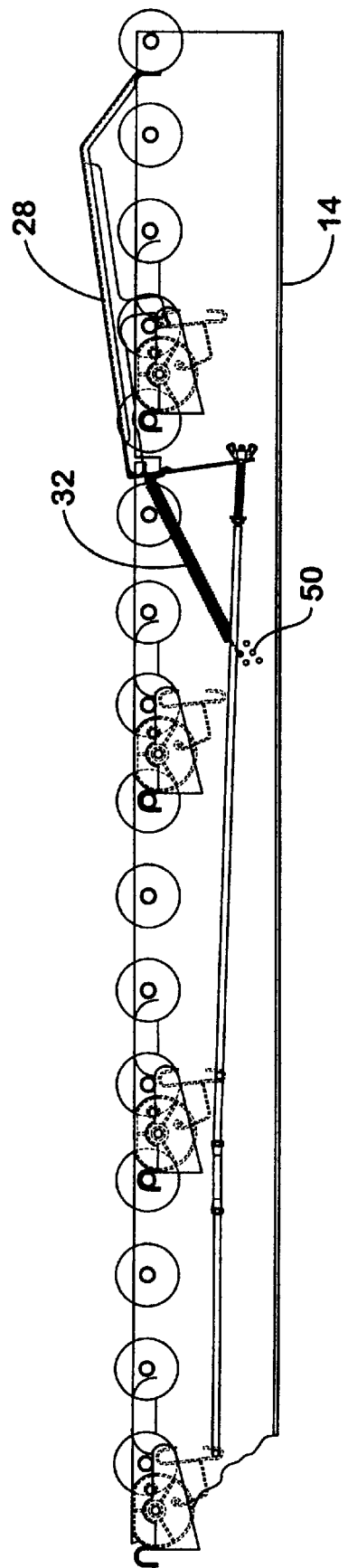
FIG. 2 is a sectional view taken along the lines II—II in FIG. 1.
Figure 3:
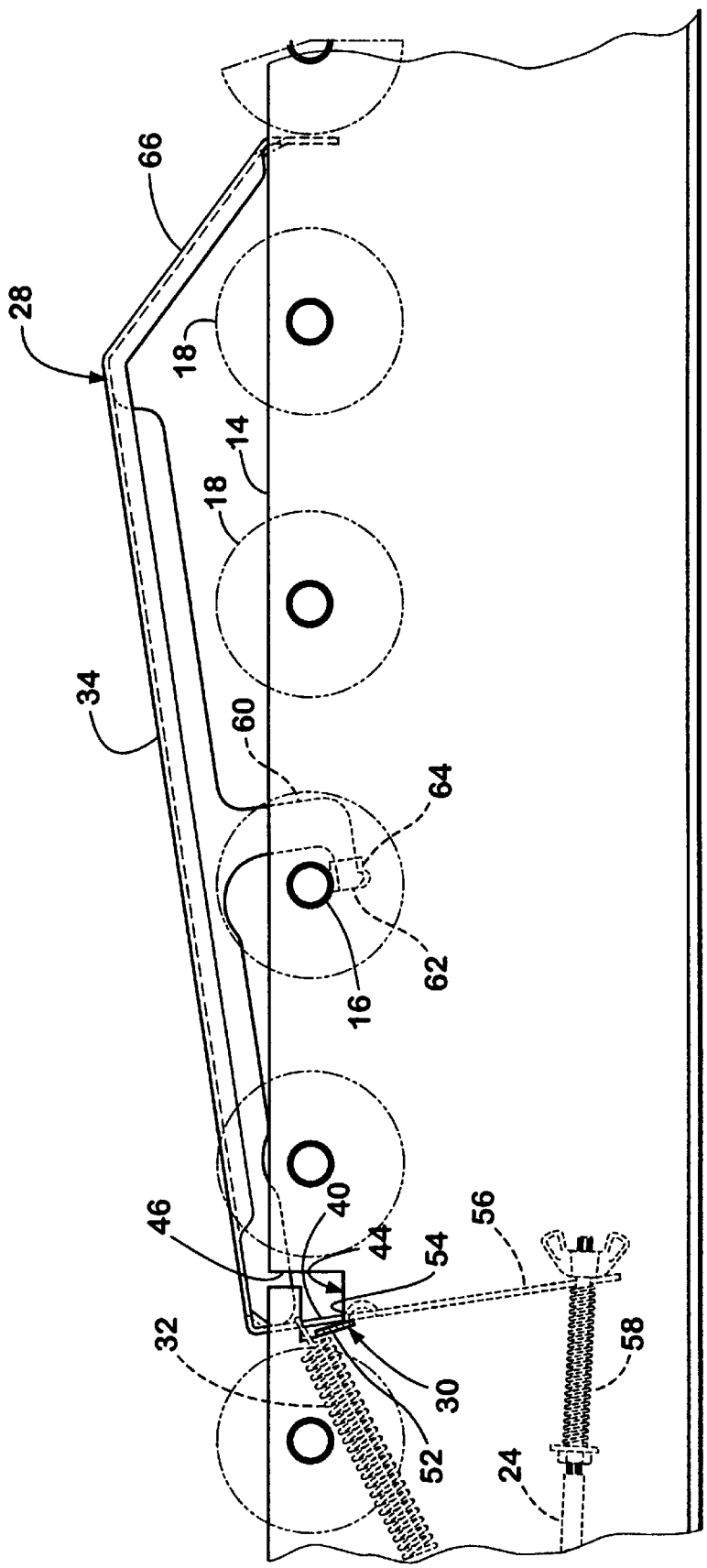
FIG. 3 is an enlarged sectional view taken along the lines III—III in FIG. 1.

Referring now specifically to the drawings, and the illustrative embodiments depicted therein, an accumulation conveyor 10 includes a frame 12 having a pair of vertical support walls 14 which support a plurality of parallel spaced apart shafts 16, each of which supports a plurality of rollers 18 which are freely rotatable on their respective shaft 16 (FIGS. 1–4). Accumulation conveyor 10 additionally includes a plurality of actuators 20 which selectively raise an endless driven belt 22, which has been removed from FIG. 1 for clarity, with respect to the plane defined by the tops of rollers 18. In this manner, when belt 22 is elevated above the tops of rollers 18 by actuators 20, articles are propelled in the direction indicated by the arrow in FIG. 1. When actuators 20 lower belt 22 below the tops of the rollers 18, articles accumulate on accumulation conveyor 10. Actuators 20 raise belt 22 above the tops of rollers 18 in response to an elongated member, such as a rod 24, being shifted longitudinally toward the left as viewed in FIG. 1. In the illustrated embodiment, actuators 20 are split-cam eccentric wheel actuators of the type disclosed in U.S. Pat. Nos. 3,854,576 for ECCENTRIC WHEEL ACCUMULATORS and 4,878,578 for SPLIT-CAM CONVEYOR ROLLERS, the disclosures of which are hereby incorporated herein by reference.

Elongated member 24 is longitudinally shifted, in order to operate actuator 20, by an article sensor 26. Article sensor 26 includes a sensing member 28 which is pivotally mounted by a shaftless bearing 30. Sensing member 28 includes a sensing portion, generally indicated at 34, which is biased in an upward direction into the path of articles moving along accumulation conveyor 10 by a bias member 32. In the illustrated embodiment, sensing portion 34 is defined by a pair of fingers which are slidably engaged by articles moving along accumulation conveyor 10. Fingers 34 are joined together downstream of bearing 30 by a lateral support 36 and are joined together at shaftless bearing 30 by a lateral bridge 38 (FIG. 6). In one embodiment, shaftless bearing 30 is a knife-edge bearing defined by a pair of portions 40 defining downward-facing knife edges 42 which are positioned in pockets 44 formed in vertical support walls 14. Shaftless bearing 30 is defined by downward-facing edges 40 which are supported by a lower surface 54 of pockets 44 in a manner which allows portions 40 to rock back and forth. In this manner, sensing member 28 rocks about downward-facing edges 42 within pockets 44. Pockets 44 include upward facing openings 46 which provide access for insertion of bridge portions 40 into pockets 44.

Lateral bridge 38 additionally includes upward-extending tabs 48 which are engaged by bias member 32, which, in the illustrated embodiment, is a coil spring. The other end of spring 32 is engaged in one of a plurality of spaced apart openings 50 defined in vertical support wall 14. In this manner, bias member 32 biases fingers 34 upwardly into the path of movement of articles along accumulation conveyor 10. Additionally, bias member 32 urges lateral bridge portions 40 into pocket 44 at a corner in the pocket between an up-stream vertical edge 52 and a bottom edge 54.

Lateral bridge 38 additionally includes a pair of downward extending arms 56 which engage elongated rod 24 through a compression spring 58. Compression spring 58 has sufficient spring force to allow sensing member 28 to shift elongated rod 24 under normal operating conditions. If, however, rod 24 becomes stalled, because of the position of the eccentric wheels of actuation 20 upon actuation, spring 58 will accommodate the movement of arms 56 until the eccentric wheels become realigned in a position wherein actuation can take place. Each finger 34 additionally includes a downward extending hook member 60 having a portion 62 which extends below a shaft 16. Hook member 60 limits the upward travel of fingers 34. A rubber cushion-sleeve 64 is provided around portion 62 in order to reduce noise upon engagement of hook member 60 and corresponding shaft 16. Each finger 34 has a downward-sloping forward portion 66 which prevents fingers 34 from becoming entangled with a downstream article on accumulation conveyor 10 and allows articles to be manually pushed upstream over sensor 26.

As may be seen by reference to FIG. 6, the vertical distance between the base of tabs 48 and the corresponding downward-facing edge 42 defines a very short lever arm, which is preferably less than 1 inch and most preferably less than one-half (½) of an inch. In the illustrated embodiment, this lever arm is approximately three-eighths (⅜) of an inch in length. In order to bias fingers 34 upwardly with such a short lever arm, the spring force of bias member 32 must be commensurately larger. Preferably, the composite spring force of bias member 32 is at least approximately 5.0 pounds. In the illustrated embodiment, the spring force of each of two springs making up bias member 32 is approximately 3.5 pounds which results in a composite spring force of at least approximately 7.0 pounds. The combination of a short lever arm and a heavy spring has the advantage that the spring is elongated only a small fraction of its length when article sensor 26 is actuated. Because spring force varies proportionate to the amount of elongation of a spring, this arrangement ensures that the spring force applied by bias member 32 is relatively constant through the range of motion of sensing member 28. Advantageously, the use of a shaftless bearing 30 allows a heavy spring force bias member 32 to be utilized. The reason is that, although the heavy spring force asserts a side load on shaftless bearing 30, the rotational friction of the bearing is relatively unaffected by side load force. This is in distinction to typical shaft bearings which increase significantly in rotational friction in response to side load force. Thus, the use of a shaftless bearing 30 in order to rotatably support sensing member 28 not only pivotally supports the sensing member in a manner which provides exceptionally low rotational friction, but does so in a manner which accommodates relatively high side-loading which allows a spring and lever arm arrangement having relatively consistent actuation force throughout the range of motion of the sensing member fingers. In this manner, article sensor 26 may be actuated by a vertical force of less than 1 pound, which would be applied by an empty article container weighing approximately 2 pounds. Preferably, article sensor 26 may be actuated by a vertical force of less than approximately 8 ounces, which would be applied by an empty article container weighing approximately 1 pound. Most preferably, the present invention is capable of actuation by a downward force of approximately 0.4 pounds, which may be applied by an empty article weighing laying approximately 0.8 pounds.

Figure 7:
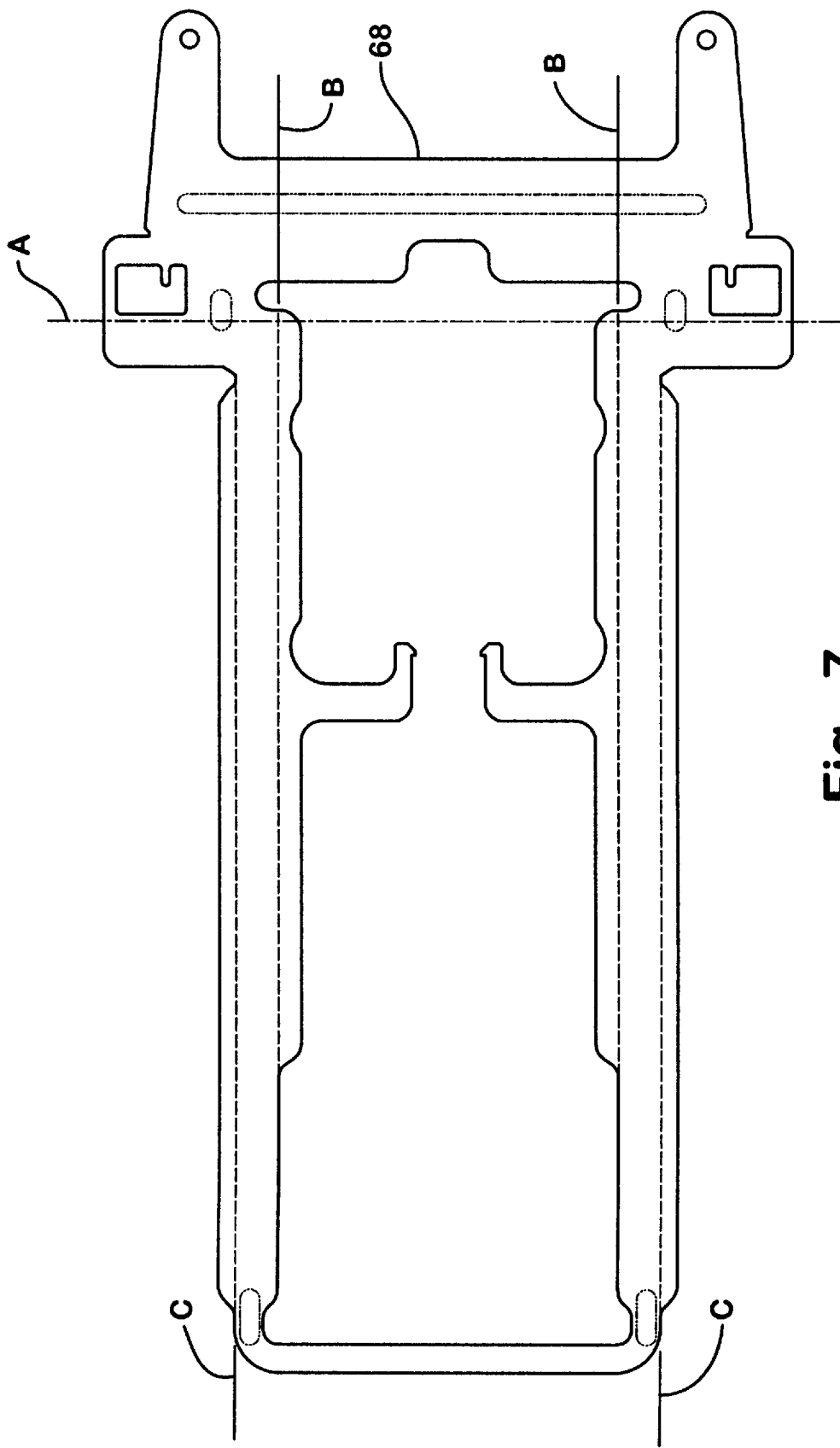
FIG. 7 is a flat pattern of a piece that is formed into the sensing member in FIGS. 5 and 6.

Advantageously, sensing member 28 may be manufactured from a single flat sheet of metal 68 as illustrated in FIG. 7. Flat sheet 68 is bent at right angles along line A in order to form lateral bridge 38 and is formed along lines B and C in order to form fingers 34. This provides exceptional mechanical rigidity to the sensing member while, concurrently, forming the support edge of the shaftless bearing as well as the lateral support 36 and the other features of sensing member 28. Once the sensing member is formed by the sheet metal processing of stamping sheet 68 and performing the bends in the sheet, the sensing member may then be readily joined with vertical support walls 14 by inserting bridge portions 40 into pockets 44 and connecting bias members 32 between openings 50 and tabs 48. This provides a stable article sensor with bias member 32 retaining the movable components of the shaftless bearing in their operational relationship.

Although the invention was illustrated with a mechanically actuated accumulation conveyor, its principles may be applied to a pneumatically actuated accumulation conveyor of the type disclosed in U.S. Pat. No. 5,191,967 for a CONVEYOR SYSTEM HAVING NON-SINGULATING ACCUMULATION CONVEYOR, the disclosure which is hereby incorporated herein by reference. In such application, actuators 20 are pneumatically operated in response to selective actuation of a valve by arms 56. In such configuration, in order to reduce the actuation force, a balance-poppet valve is preferable.

The invention is illustrated with fingers as the sensing portion of the sensing member. The sensing portion could be formed in any manner known in the art, such as incorporating a sensing roller of the type disclosed in the '967 patent. Although the invention is illustrated with an extension spring, a compression spring or a torsion spring could be utilized. Alternatively, the bias member may be a counterweight, as is known in the art.

The present invention additionally provides the capability for a slug discharge for accumulation conveyor 10. The actuation of the elongated rod through a motion-absorbing compression spring may allow the use of an actuating cylinder, such as an air cylinder, to be utilized in order to join together rod actuators for all accumulation zones. The rods may be actuated irrespective of the position of the associated article sensor as would be appreciated by those of ordinary skill in the art.

An alternative embodiment of a shaftless bearing, generally designated 70, is illustrated in FIG. 8. Shaftless bearing 70 includes a flat, flexible member 72 which is fixed at a lower end 74 in a slot within pocket 44. Actuation of sensing member 28 causes flexible member 72 to flex forwardly in order to pivotally support the sensing member with respect to support wall 14. Shaftless bearing 70 has the same attributes as bearing 30 of very low friction and substantial immunity from the side-loading created by the downward force of actuation.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A conveyor article sensor for sensing articles on a conveying surface, comprising;
    a sensing member having a sensing portion;
    a shaftless bearing which mounts said sensing member to pivot about a horizontal axis; and
    a bias member which biases said sensing member into an article-sensing position.

2. The article sensor in claim 1 wherein said bias member is a spring acting on a lever arm defined by said sensing member.

3. The article sensor in claim 2 wherein said sensing portion moves an actuation distance in response to an actuation force and said lever arm is configured to distort said spring much less than said actuation distance.

4. A conveyor article sensor for sensing articles on a conveying surface,
    a sensing member having a sensing portion;
    a bearing defined by a knife edge which rockingly supports said sensing member on a surfaces; and
    a bias member which biases said sensing member into article-sensing position.

5. A conveyor article sensor for sensing articles on a conveying surface comprising;
    a sensing member having a sensing portion;
    a bearing defined by a flexible member fixed at one end to a stationary member and at an opposite end to said sensing member; and
    a bias member which biases said sensing member into an article-sensing position.

6. The article sensor in claim 4 wherein said bearing is positioned in a pocket.

7. The article sensor in claim 6 wherein said spring biases said bearing into said pocket.

8. The article sensor in claim 1 wherein said sensing member and a portion of said shaftless bearing are commonly formed from a flat stock.

9. The article sensor in claim 1 wherein said activation force is less than approximately 16 ounces.

10. The article sensor in claim 7 wherein said activation force is less than approximately 8 ounces.

11. An accumulation conveyor, comprising a frame and an article conveying surface supported by said frame;
    at least one article-sensing member positioned along said article conveying surface and having a sensing portion;
    said at least one sensing member being pivotally supported by a shaftless bearing to pivot about a horizontal axis and biased into an article-sensing position above said conveying surface; and
    an actuator which responds to said sensing member in order to control at least a portion of said conveying surface.

12. The accumulation conveyor in claim 11 wherein said actuator is mechanically actuated by said at least one article-sensing member.

13. The accumulation conveyor in claim 12 wherein said at least one article-sensing member includes an actuation portion and wherein said actuator is mechanically actuated by a rod extending from said actuation portion.

14. The accumulation conveyor in claim 13 wherein said actuation portion is coupled to said rod through a compressible member.

15. The accumulation conveyor in claim 14 wherein said compressible member is a spring.

16. The accumulation conveyor in claim 11 wherein said actuator is pneumatically actuated by said at least one article-sensing member.

17. The accumulation conveyor in claim 16 where in said sensing member includes an actuation portion and wherein said actuator is pneumatically actuated by a valve operated by said actuation portion.

18. The accumulation conveyor in claim 17 wherein said valve is a balanced poppet valve.

19. The accumulation conveyor in claim 11 wherein said at least one sensing member is biased by a spring acting on a lever arm defined by said sensing member.

20. The accumulation conveyor in claim 19 wherein said sensing portion moves an actuation distance in response to an actuation force and said lever arm is configured to distort said spring much less than said actuation distance.

21. An accumulation conveyor, comprising a frame and an article conveying surface by said frame;
    at least one article member positioned along said article conveying surface and having a sensing portion;
    a bearing defined by a knife edge which rockingly supports said at least one article-sensing member on a surface;
    a bias member which biases said at least one article-sensing member into an article-sensing position above said conveying surface; and
    an actuator which responds to said at least one article-sensing member in order to control at least a portion of said conveying surface.

22. Am accumulation conveyor, comprising a frame and an article conveying surface supported by said frame;
    at least one article-sensing member positioned along said article conveying surface and having a sensing portion;
    a bearing defined by a flexible member fixed at one end to a stationary member and at an opposite end to said at least one article-sensing member;

a bias member which biases said at least one article-sensing member into an article-sensing position above said conveying surface; and an actuator which responds to said at least one article-sensing member in order to control at least a portion of said conveying surface.

23. The accumulation conveyor in claim 21 wherein said bearing is positioned in a pocket.

24. The article sensor in claim 23 wherein said spring biases said bearing into said pocket.

25. The accumulation conveyor in claim 23 wherein said pocket is formed in said frame.

26. The accumulation conveyor in claim 11 wherein said at least one sensing member and a portion of said shaftless bearing are commonly formed from a flat stock.

27. The accumulation conveyor in claim 11 wherein said activation force is less than approximately 16 ounces.

28. The accumulation conveyor in claim 27 wherein said activation force is less than approximately 8 ounces.

29. A conveyor article sensor for sensing articles on a conveying surface supported by a frame, comprising;

a shaftless bearing;

a sensing member pivotally supported by said shaftless bearing and having a sensing portion which moves an actuation distance in response to an actuation force; and a spring biasing a sensing portion of said sensing member into an article-sensing position;

wherein said spring is attached to said sensing member at a location which causes said sensing member to distort said spring much less than said actuation distance in response to an actuation force.

30. The article sensor in claim 29 wherein said spring has a composite spring force greater than approximately 5 pounds.

31. The article sensor in claim 30 wherein said activation force is less than approximately 16 ounces.

32. The article sensor in claim 31 wherein said activation force is less than approximately 8 ounces.

33. A conveyor article sensor for sensing articles on a on a conveying surface supported by a frame, comprising;

as sensing member having a sensing portion which moves as actuation distance in response to an actuation force;

a bearing defined by a knife edge which rockingly supports said sensing member on a surface; and a spring biasing a sensing portion of said sensing member into an article-sensing position;

wherein said spring is attached to said sensing member at a location which causes said sensing member to distort said spring much less than said actuation distance in response to an actuation force.

34. A conveyor article sensor for sensing articles on a conveyor surface supported by a frame, comprising;

a sensing member having a sensing portion which moves actuation distance in response to an actuation force;

a bearing defined by a flexible member fixed at one end to a stationary member and at an opposite end to said sensing member; and a spring biasing a sensing portion of said sensing member into an article-sensing position;

wherein said spring is attached to said sensing member at a location which causes said sensing member to distort said spring much less than said actuation distance in response to an actuation force.

35. The article sensor in claim 29 wherein said shaftless bearing includes a bearing member positioned in a pocket.

36. The article sensor in claim 35 wherein said spring biases said bearing member into said pocket.

37. The article sensor in claim 29 wherein said sensing member and pivot are commonly formed from a flat stock.

38. The article sensor in claim 29 wherein said spring acts on said sensing member through a lever arm which is less than approximately one inch in length.

39. The article sensor in claim 38 wherein said lever arm is less than approximately one-half inch in length.

* * * * *